May 16, 1950 — P. E. SPAHN — 2,508,079
APPARATUS FOR USE IN THE MANUFACTURE OF
MULTIPLY GLASS SHEET GLAZING UNITS
Filed Jan. 2, 1948 — 5 Sheets-Sheet 1
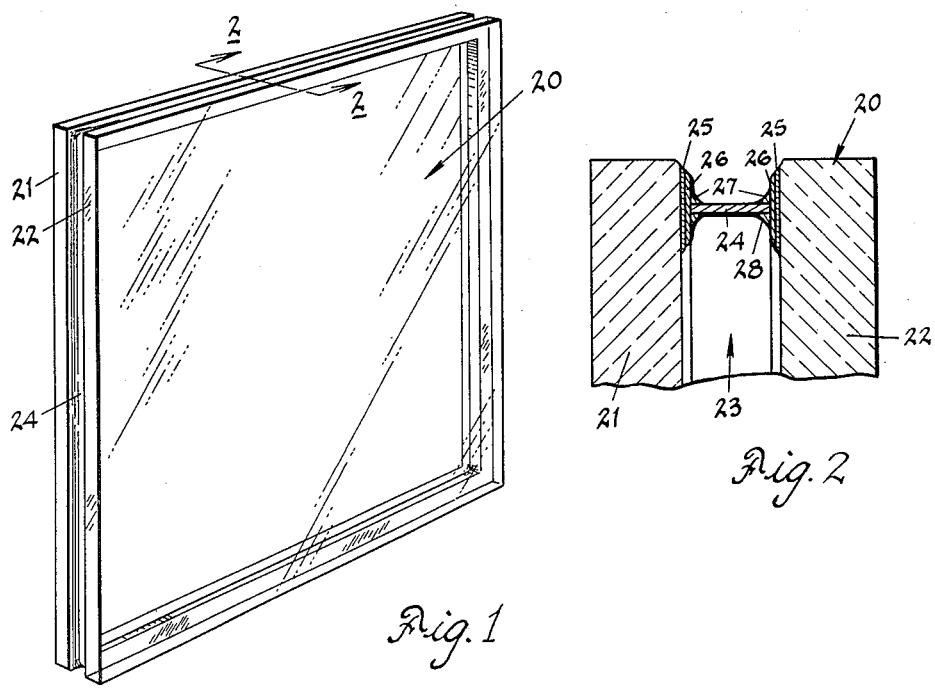
Fig. 1
Fig. 2
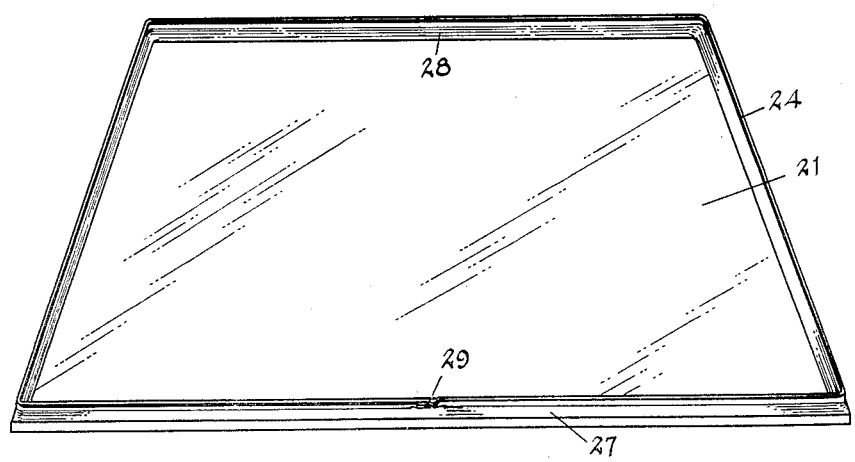
Fig. 3
INVENTOR.
Paul E. Spahn
BY Nobbe & Swope
ATTORNEYS May 16, 1950

P. E. SPAHN 2,508,079

APPARATUS FOR USE IN THE MANUFACTURE OF
MULTIPLY GLASS SHEET GLAZING UNITS

Filed Jan. 2, 1948

INVENTOR.
Paul E. Spahn
BY
Nobbe & Swope
ATTORNEYS

May 16, 1950
P. E. SPAHN
2,508,079
APPARATUS FOR USE IN THE MANUFACTURE OF
MULTIPLY GLASS SHEET GLAZING UNITS
Filed Jan. 2, 1948
5 Sheets-Sheet 4
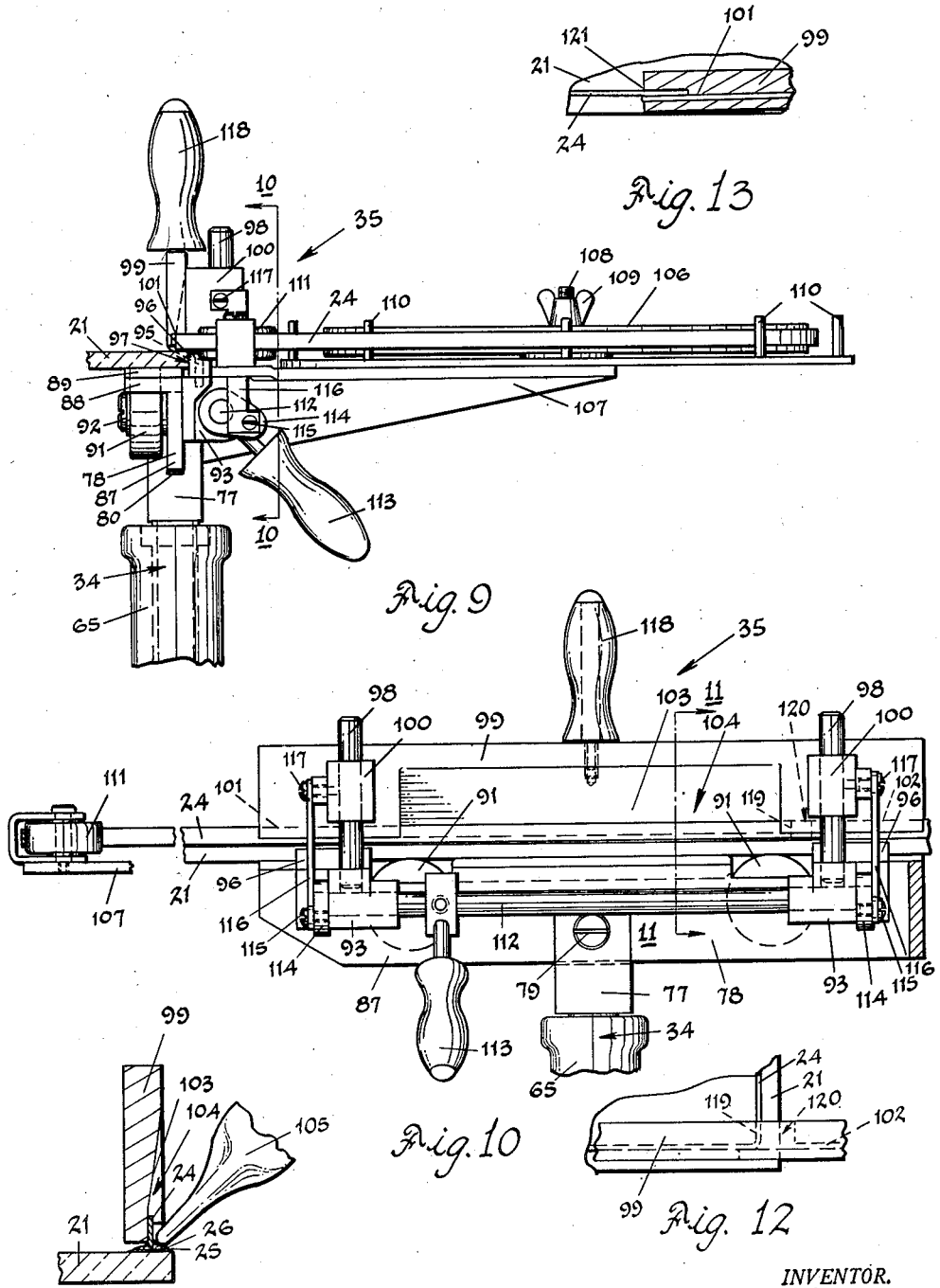
INVENTOR.
Paul E. Spahn
BY
Nobbe & Swope
ATTORNEYS

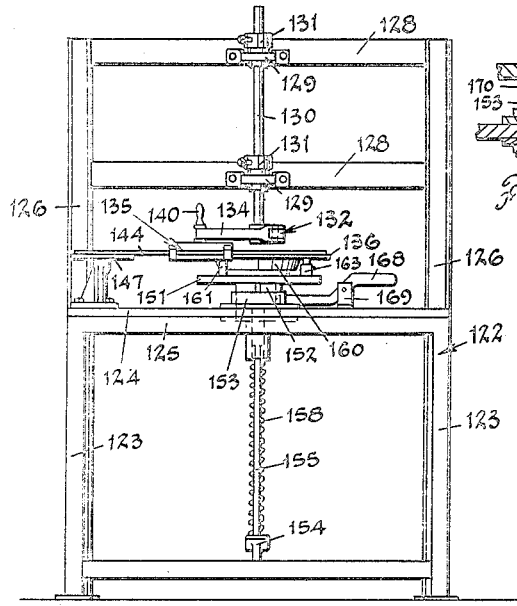

Patented May 16, 1950

2,508,079

UNITED STATES PATENT OFFICE 2,508,079

APPARATUS FOR USE IN THE MANUFACTURE OF MULTIPLY GLASS SHEET GLAZING UNITS

Paul E. Spahn, Toledo, Ohio, assignor to Libbey-Owens-Ford Glass Company, Toledo, Ohio, a corporation of Ohio Application January 2, 1948, Serial No. 72

8 Claims. (Cl. 113—59)

1

The present invention relates to improvements in apparatus for use in the fabrication of multiply glass sheet glazing units.

More particularly, the invention has to do with the assembly of the type of glazing unit disclosed in Patent No. 2,283,253, May 19, 1942, and which comprises generally two or more sheets or plates of glass spaced apart by metallic separator means which are bonded to the glass sheets around the marginal portions thereof through the intermediary of a metallic coating or coatings thereon to form an all glass-metal, hermetically sealed structure.

In the fabrication of this type unit, the glass sheets, after proper cleaning, are provided with metallic coatings around the marginal or border portions on one or both surfaces thereof depending upon the number of sheets to be employed in the unit. It is preferred that the coatings on the glass sheets be produced from pure copper or an alloy of copper as it has been found that pure copper and some of its alloys can be sprayed upon the glass very satisfactorily and also weather well in use. In such spraying operation, it has been customary to use a spray gun to which a wire of the desired composition is fed, melted, and sprayed in fine particles upon the glass. These metallic coatings are then tinned with a coating of solder or equivalent bond-inducing metallic material which is preferably applied in the presence of a suitable flux. A metallic separator strip in the form of a ductile lead tape of suitable dimensions is then prepared by coating both sides thereof along its edges with a solder or other bond-inducing metallic substance compatible with the solder coatings on the glass sheets so that upon application of heat, and if desired additional solder, the separator strip can be soldered or sweated to the metallic coatings on the glass. It is customary in such operation to position the separator strip inwardly of the edges of the glass sheets and substantially centrally of the metallic coatings thereon so that upon soldering of the strips to the coatings, fillets of solder will be formed to more effectively secure the strips to the coatings and provide an air and moisture-tight seal therebetween.

This assembly of the separator strip with the glass sheet has heretofore been a manual operation, with the positioning of the separator strip and the soldering thereof to the glass being dependent upon the skill of the workman. However, and notwithstanding the use of gauge blocks to assist the operator in positioning the metallic separator strip upon the glass, it has been difficult for the operator to maintain the separator strip

2 in desired position in a straight line along the glass sheet centrally of the metallic coating while progressively soldering the strip thereto.

An important object of this invention is the provision of apparatus for feeding the metallic separator strip to the glass sheet; for simultaneously accurately positioning it upon the metallic coating on the glass sheet and for effectively maintaining it in such position during the soldering thereof to the glass.

Another object of the invention is the provision of apparatus for locating the separator strip a predetermined distance from the edge of the glass sheet and preferably substantially centrally of the metallic coating on the glass and for enabling it to be held against the glass with a desired substantially uniform pressure during the soldering operation.

Another object of the invention is the provision of apparatus of the above character for continuously feeding the metallic separator strip to the glass sheet upon relative movement between said apparatus and sheet in such a way that the strip will be maintained taut and in a straightened condition during the soldering operation.

A further object of the invention is the provision of apparatus of the above character of relatively simple construction, and embodying a tape metering or applying unit which can be rapidly and conveniently manipulated by the operator to effect the securing of the separator strip along all edges of the glass sheet to form a continuous unbroken separator extending around the marginal portions thereof.

Other objects and advantages of the invention will become more apparent during the course of the following description, when taken in connection with the accompanying drawings.

In the drawings, wherein like numerals are employed to designate like parts throughout the same:

Fig. 1 is a perspective view of a multiply glass sheet glazing unit in the assembly of which the apparatus of the present invention may be employed;

Fig. 2 is an enlarged sectional view of the unit taken substantially on line 2—2 of Fig. 1;

Fig. 3 is a perspective view of one glass sheet having the metallic separator strip secured thereto;

Fig. 7 is a section taken substantially on line

Figure 4:
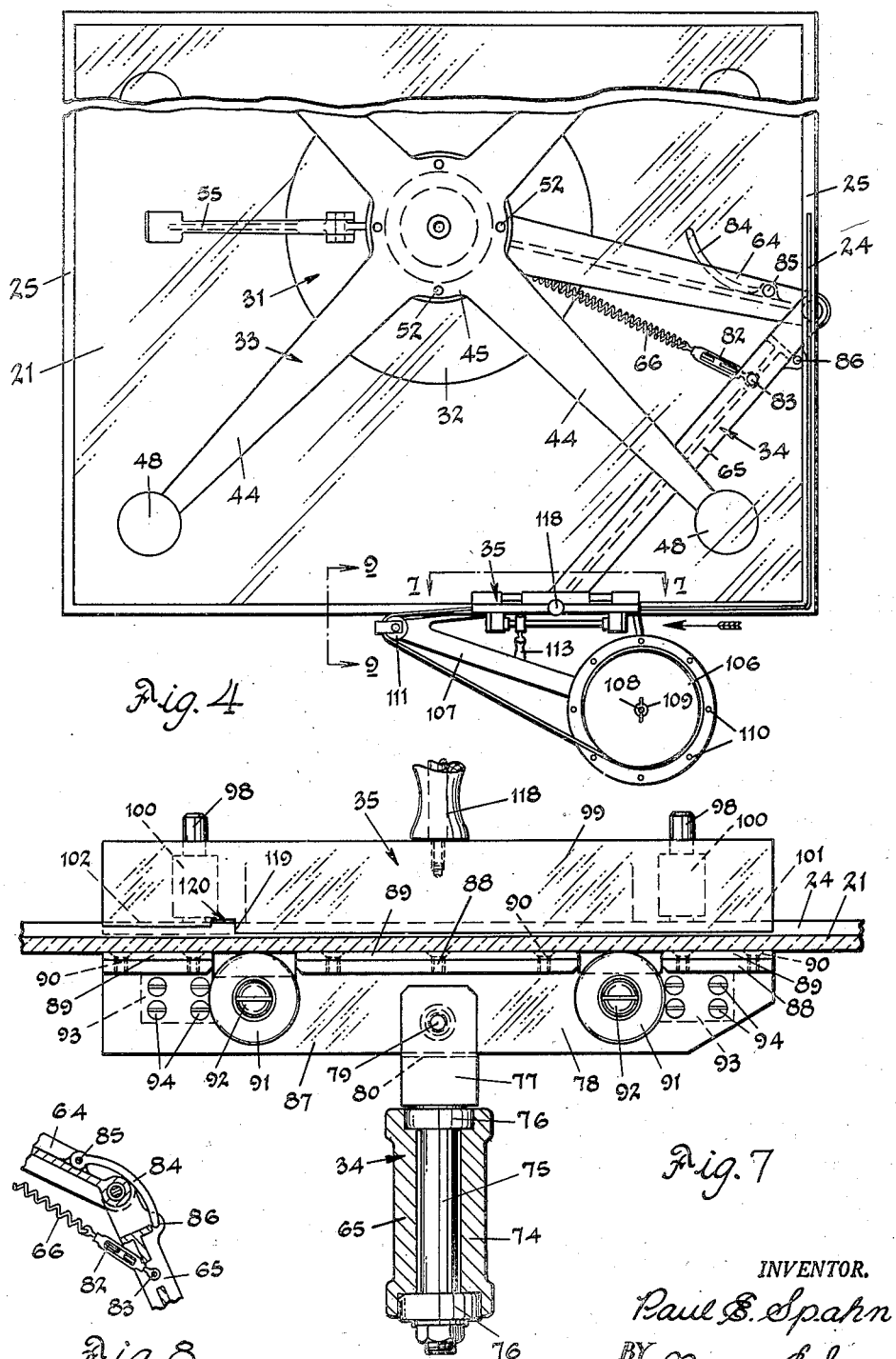
Fig. 4 is a plan view of apparatus constructed in accordance with this invention.

7—7 of Fig. 4 and illustrates a side elevation of the tape applying unit for the separator strip;

Fig. 8 is a detail section of the tape applying unit support in position to permit placement of a glass sheet upon the apparatus;

Fig. 9 is an end view of the tape applying unit taken on line 9—9 of Fig. 4;

Fig. 10 is a side view of the tape applying unit, substantially opposite the side shown in Fig. 7;

Fig. 11 is a detail vertical section, taken substantially on line 11—11 of Fig. 10, illustrating the relative positions of the tape applying unit, the glass sheet and a soldering iron during attachment of the metallic separator strip to the glass;

Fig. 12 illustrates the formation of a corner by bending of the metal tape constituting the separator;

Fig. 13 is a detail view showing the overlapping of the ends of the separator strip upon completion of the assembling operation;

Fig. 14 is a side elevation of a modified type of apparatus provided by the invention;

Fig. 15 is a plan view thereof;

Fig. 16 is a side view of a portion of the tape applying unit for the separator strip;

Fig. 17 is a section taken substantially on line 17—17 of Fig. 16;

Fig. 18 is a detail view of a portion of the means for securing a glass sheet upon the apparatus;

Fig. 19 is a detail section of the means for actuating the glass supporting table; and Fig. 20 is a detail view of the table raising and lowering means.

With reference now to the drawings and particularly to Figs. 1 and 2, the numeral 20 designates an all glass-metal multiply glazing unit consisting generally of two sheets or plates of glass 21 and 22 arranged in spaced, substantially parallel relation to provide an insulating air space 23 therebetween. This air space is formed by a metal separator strip 24 joined to the glass sheets around the marginal portions thereof through the intermediary of metallic coatings 25 applied to the glass sheets. It is preferred that the separator strip be formed from a ductile lead tape and that the lead tape and metallic coatings 25 on the glass sheets be joined together by solder or other inorganic bonding material. To this end the metallic coatings 25, which are preferably of copper or a copper alloy sprayed upon the glass, are tinned with layers of solder 26 and the lead separator secured to the solder coatings in such a way as to form solder fillets 27 and 28 on opposite sides of the separator strips. The soldering of the parts together is in effect a sweat job and the materials are controlled as to composition and form that the fillets 27 and 28 serve to both strengthen and seal the unit and thus help to insure its permanency.

In fabricating the glazing unit 20, the separator strip 24 is first fixed to one of the glass sheets, such as sheet 21, completely around its perimeter as illustrated in Fig. 3, with the separator strip being preferably positioned substantially midway between the opposite edges of the metallic coatings 25. As shown, the separator strip 24 consists of a continuous length of lead tape, with the two ends thereof being secured in overlapping relation to one another as indicated at 29. A second sheet of glass, such as sheet 22, is then laid upon the separator strip, and when the preassembled unit is turned over, the separator strip is secured to the glass sheet 22.

The present invention is concerned primarily with the provision of apparatus, under the control of an operator, for accurately locating the separator strip upon the first sheet of glass and for effectively maintaining it in position thereon during the soldering operation. One form of apparatus is shown in Figs. 4 to 13 of the drawings and is generally indicated by the numeral 30. Such apparatus comprises a pedestal 31 in the form of a hollow standard having a base 32 and carrying at its upper end a horizontal glass supporting spider frame 33 and an articulated support 34 for the metal tape metering unit 35. The upper end of standard 31 is bored to receive the lower end of a pin 36 having an upper end portion 37 of reduced diameter resulting in the formation of a shoulder 38. Carried upon the upper reduced portion 37 of pin 36 is a horizontal plate 39 having a collar 40 fitting over said reduced portion 37 and seating on the shoulder 38. If desired, the plate 39 may be secured thereon by a set screw 41 threaded through the collar 40 and bearing against the pin 37. The central area of the plate 39, indicated at 42, is suitably finished to afford a bearing surface for a complementary surface 43 provided on the underside of the glass supporting spider frame 33.

As best seen in Fig. 4, the spider frame 33 has a plurality of arms 44 emanating radially from a central body portion 45 which is provided with the finished surface 43 resting on the finished surface 42 of plate 39. The central body portion 45 has an opening 46 for concentrically locating the spider on the reduced end 37 of pin 36 and on the plate 39. Each of the arms 44 is provided at its outer end with an enlarged boss 47 for supporting the glass sheet 21 and, preferably, an annular pad 48 of rubber or other resilient composition, is located in the boss to prevent marring of the glass surface.

The spider 33 is rotatable about the axis of pin 36, and means is provided for locking it against undesirable rotation, comprising a latch 49 actuated to release or engage the spider 33 to permit or prevent its movement relative to the plate 39. The latch 49 includes a pin 50 received in a boss 51 formed on the plate 39 and slidable vertically into any one of a plurality of openings 52 provided in the body portion 45 of the spider. Preferably, the openings 52 are located in a spaced relation of 90 degrees to each other so that upon rotation of the spider, a side of the glass sheet can be moved to the position occupied by a preceding side.

The pin 50 is movable within the boss 51 and relative to the openings 52 by a linkage which comprises a substantially horizontal lever 53, vertical rod 54, and foot pedal 55. The lever 53 is pivotally supported intermediate its ends in the collar 40 of plate 39 on a pintle 56 and is connected at one end to the latch pin 50 by a pin 57 and at its opposite end to the upper end of rod 54 by the pin 58. The rod 54 extends downwardly through the hollow pedestal 31 and is pivotally connected as at 59 to the inner end of the foot pedal 55. The pedal 55 is pivotally supported on the base 32 of pedestal 31 by a pin 60 carried in ears 61 rising from the base. The free end 62 of the foot pedal extends outwardly from the base a sufficient distance to allow the operator to depress the pedal without awkward reaching or stretching in the event it is desired to rotate the spider 33 such as when a glass sheet of large dimension is being processed.

Pivotal movement of the foot pedal to depress the outer end 62 thereof causes the rod 54 to be moved upwardly and to lift the end of the lever 53 to which it is connected, which causes a corresponding downward swing of the opposite end of said lever for withdrawing the latch pin 50 from the opening 52. The spider 33 may then be revolved about the axis of pin 36 until the next opening 52 registers with the latch pin 50 to bring another edge of the glass sheet into position for receiving lead tape from the metering unit 35. To assure locking of the spider 33 in any one of the positions to which it may be revolved, a spring 63 is supported in the base 32 of pedestal 31 to bear against the foot pedal 55 outwardly of pivot point 60 and thereby urge it upwardly from a depressed position when released from control of the operator's foot.

The metering unit 35 which feeds the metal tape, forming the separator strip, to the glass and accurately locates it in a predetermined position with respect to the edge of the glass sheet is carried by the articulated support 34 in such a manner as to permit parallel movement thereof along the edges of the glass sheet, and within desired limits vertical angular movement with reference to the surfaces of the glass.

Figure 5:
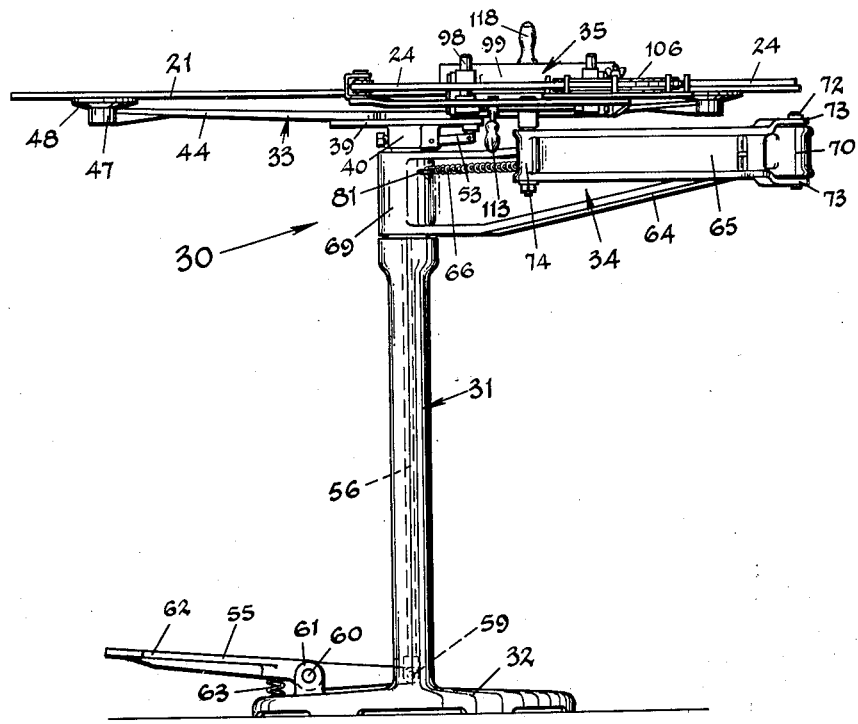
Fig. 5 is a side elevation thereof.
Figure 6:
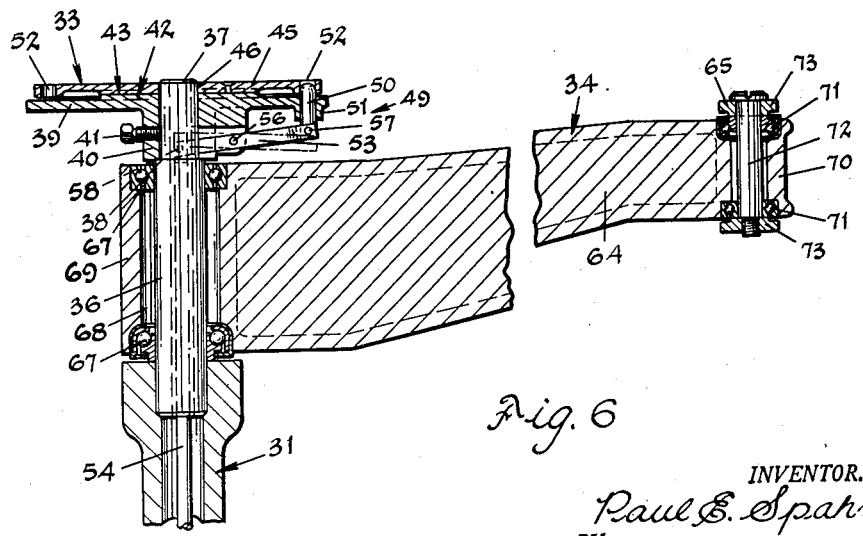
Fig. 6 is a detail sectional view of the upper portion of the apparatus.

As illustrated particularly in Figs 4, 5 and 6, the articulated support 34 is composed of the two pivotally connected arms 64 and 65, with the metering unit 35 being carried at the outer end of arm 65. The arms 64 and 65 are yieldably urged toward each other by a suitable spring 66 which counteracts a tendency for the arms to spread out or open elbow-wise while at the same time allowing a freedom of opening and closing as may be caused by projection of the unit 35 along the glass.

In the construction shown in Fig. 6, the arm 64 is carried at its inner end on the pin 36, being mounted on bearings 67 located in recessed ends of the bore 68 formed in the ends 69 of arm 64, to insure freedom from radial and/or surface fraction. The opposite end 70 of arm 64 has similar bearings 71 located therein and receiving a connector bolt 72 which extends through the yoke portions 73 of the inner bifurcated end of arm 65. In a similar arrangement, there is carried at the outer end 74 of arm 65 a shaft 75 freely rotatable in bearings 76 and provided at its upper end with a yoke 77 for receiving the frame 78 of the metering unit 35, said frame being pivoted intermediate its ends within the yoke 77 upon a horizontal pin 79. In order to permit slight vertical angular movement of the frame 78 upon the pin 79, the slot 80 within the yoke is made of sufficient depth to allow for such angular movement about the supporting pin 79. It will thus be seen that the articulation of the arms 64 and 65 will permit sliding of the metering unit 35 in a straight path along any edge of the glass sheet, with the arms 64 and 65 opening when the metering unit is moved to the left as viewed in Fig. 4, and closing when the unit is moved to the right.

The spring 66, which causes folding of the arms 64 and 65 toward one another, is connected at one end to a screw eye 81 threaded into the end 69 of arm 64, while the opposite end is connected to the arm 65 by a turn-buckle 82 carried by a bolt 83 in order that the tension of the spring can be adjusted as desired. When loading a sheet of glass onto the spider 33, the arms 64 and 65 are opened sufficiently, as shown in Fig. 8, to permit positioning of the glass without interference by the metering unit 35. In order to hold the arms 64 and 65 in open or extended position, a hook 84 is pivotally attached at one end to the arm 64 as at 85, while the opposite end thereof is received in an opening 86 in the arm 65 to prevent closing of the arms by the spring 66. Having suitably positioned a sheet of glass, such as the sheet 21, on the pads 48 of spider 33, the hook 84 is removed from the opening 86, thereby permitting free relative movement of the arms 64 and 65 and the locating of the metering unit in desired operative position relative to the edge of the glass.

Due to the pivotal support of the unit by the yoke shaft 75 in bearings 76, the frame 78 of the unit will remain in constant relation with respect to the edge of the glass sheet as the unit is moved by the operator in a direction from right to left as viewed in Fig. 4, during which movement the two sections of the arm 33 will progressively open until a corner of the sheet is reached.

The frame 78 of the metering unit 35 comprises a horizontal angle strip or bar having a vertical leg 87 and a forwardly extended horizontal leg 88. The horizontal leg 88 is covered by a strip 89, of fiber or other suitable material, secured thereto by countersunk screws 90, said strip being adapted to engage the undersurface of the glass sheet when the unit is in operative position as shown in Fig. 9. To reduce friction upon relative movement between the glass sheet and metering unit, the horizontal leg 88 and strip 89 are cut away adjacent their opposite ends to receive the rubber tired casters 91 mounted for free rotation upon horizontal stub shafts 92, said casters also engaging the undersurface of the glass sheet to facilitate movement of the metering unit with respect thereto. Carried upon the back of the vertical leg 87, adjacent the opposite ends thereof, are bearing members 93 secured thereto by screws 94, while secured upon the tops of the bearing members, by screws 95, are fiber blocks 96 adapted to engage the outer edge 97 of the glass sheet 21. The blocks 96 are normally maintained in engagement with the edge of the glass sheet by the action of the spring 66 which tends to close the arms 64 and 65.

Also secured to the bearing members 93 and rising therefrom are the vertical posts 98 on which is slidably mounted a guide plate 99 which is disposed above the glass sheet and is adapted to properly locate the metal tape 24 on said sheet and hold it in such position during the soldering operation, as will be more fully hereinafter described. As shown, there are secured to the plate 99, blocks 100 for loosely receiving the posts 98 therethrough so that the said plate is movable freely upwardly and downwardly.

The guide plate 99 is provided in the bottom edge thereof and adjacent its opposite ends with the channels or grooves 101 and 102 for receiving the metal tape 24 therein, while the central portion of the plate between the channels is cut back or relieved to form a sloping wall 103 as best seen in Fig. 11. Thus, there is provided a central area 104 within which the metal tape will be exposed to permit convenient soldering thereof to the metallic coating 25 on the glass sheet by the use of a soldering iron 105.

The metal tape 24 is supplied to the guide plate 99 from a reel 106 removably carried upon a horizontal shelf 107 extending from and forming a part of the main portion of the frame 78. The reel is preferably freely located on a vertical axle 108 and, if desired, the end of the axle may be threaded to receive a wing nut 109 to prevent accidental displacement of the reel. The shelf 107 has a plurality of circularly located pegs 110 which form a barrier to restrain the tape as it is withdrawn from the reel and gradually expands from its coiled position. The metal tape 24 is guided from the reel 106 to the guide plate 99 about a roller 111 which is positioned on a part of the frame 78 so that the tape is fed from the roller to the entry end of the guide plate in a substantially straight line.

Generally stated, in the operation of the apparatus, the metal tape 24 is first withdrawn from the reel 106 around the roller 111 and passed through the channel or groove 101 at the forward end of guide plate 99 into the central area 104 where it can be tacked to the metallic coating 25 on the glass such as by the use of the soldering iron 105 (Fig. 11). As the metering unit is then drawn forwardly along the edges of the glass sheet and in a direction away from the tacked end of the tape, the tape will be played out from the reel and properly located upon the glass sheet. During such movement of the metering unit, the operator, by use of the soldering iron, effects the soldering of successive portions of the metal tape to the metallic coating on the glass by drawing the iron along the juncture of the tape and metallic coating on the glass sheet as indicated in Fig. 11. During such movement the fiber blocks 96, engaging the edge of the glass sheet 21, will locate the metal tape a predetermined distance inwardly from the edge of the sheet and preferably substantially centrally of the metallic coating 25 on the glass. Also, by reason of the tension applied to the tape, upon sliding movement of the metering unit along the edge 97 of the glass sheet, it will be maintained taut and in a straightened condition, eliminating any kinks or waviness in the separator strip.

Ordinarily, the free end of the metal tape 24 is preferably affixed to the metallic coating 25 on the glass at a point substantially midway along one side of the sheet as illustrated in Fig. 4. Such a procedure affords sufficient space for overlapping of the ends of the metal tape upon completion of the soldering operation as will be more fully hereinafter described.

The guide plate 99 not only serves to properly locate the metal tape on the glass, but also enables it to be held firmly against the glass during the soldering operation. Thus, the guide plate effects a "hold-down" pressure upon the tape, while at the same time it may be raised to release the tape or to accommodate tapes of different widths. To this end, there is provided a horizontal shaft 112 extending between and through the bearings 93 and carrying a handle 113. Attached to each end of the shaft 112 is a lever 114 to which is secured, by a screw 115, a vertical link 116, said link being secured at its upper end to the respective block 100 by a screw 117. Upon movement of the handle 113 to rotate the shaft 112, the blocks 100 will slide along posts 98 to raise or lower the guide plate. Also, the operator, by pressing down on the handle 113, can apply the desired pressure to the metal tape to maintain it in proper relation with respect to the glass sheet and thus avoid accidental displacement thereof.

The metering unit 35 can thus be moved along a side of the glass sheet while feeding the metal tape 24 onto the metallic coating 25 on the glass with a degree of pressure sufficient to hold the tape edge firmly against the coating and yet not create a frictional load of such proportion as to reduce freedom of sliding movement of the unit relative to the glass sheet. A handle 118 carried on the upper edge of the guide plate 99 facilitates movement of the unit by the operator as he works the fillet of solder 27 against the tape 24 and metallic coating 25. When the tape attachment has approached the end of one side of the glass sheet 21, and it becomes necessary to form a corner in the tape before proceeding along another side, the unit 35 is moved bodily horizontally around the corner of the glass sheet and positioned along the next side. As the unit is turned, the forward end thereof is forced downwardly to tilt the rear end slightly upwardly about the pin 79 in yoke 77 to release the short length of tape from the channel or groove 102 in the guide plate so that the tape engaging the vertical edge 119 of the recess 120 will be bent to form a corner as illustrated in Fig. 12. As shown in Fig. 7, the channel or groove 102 engages only the uppermost edge portion of the metal tape so that only a slight tilting of the metering unit is necessary to release the tape from said channel. This is also facilitated by making the recessed portion 120 slightly deeper than the width of the tape.

At this stage of the assembly operation, the glass sheet may or may not be rotated according to its size or the desire of the operator. In the event the operation is performed in an area in which the operator can and desires to work around the glass, the metering unit 35 is moved first along one side and then along another with the operator traversing each side as the soldering is performed. On the other hand, if he wishes to rotate the sheet, the outer end of foot pedal 55 is depressed to retract the latch pin 50 from the immediate opening 52 and allow rotation of the spider 33 a quarter turn to the next opening 52. By reason of the pivotal mounting of the arms 64 and 65, they freely follow or move with the spider 33 so that there will be no displacement of the metering unit relative to the glass sheet. Upon approach of the metering unit to the starting point, the required length of metal tape is severed from the continuous supply on the reel 106 and as the end of the tape, first affixed to the glass, is arrived at, the following end is caused to overlap along the outer surface thereof and the two end portions secured to one another. To this end, and as shown in Fig. 13, the entry end 121 of channel 101 is of a width substantially equal to two thicknesses of the lead tape to allow overlapping of the ends of the tape as indicated at 29 in Fig. 3.

A continuous separator strip 24 will thus be formed on the metallic coating 25 of the glass sheet 21. The separator strip 24 having been joined to the first sheet of glass, the assembly so formed is then inverted with or over a second sheet of glass, such as sheet 22, and the soldering job completed by operating the iron or other heating element on the exterior coating of solder carried by the separator strip.

After the glass sheets and metal separator strip have been joined together and to insure the desired permanency of the unit, it is preferred to establish a predetermined air or gas condition within the space between the glass sheets. To accomplish this, the separator strip may be punctured at two or more points to permit insertion of hypodermic needles or other instruments which allow passage of dehydrated air through the space to prevent later condensation within the space 23 or fogging of the unit when in use. In most cases, dehydrated air at normal atmospheric pressure will be satisfactory, but for other uses a partially evacuated condition or even a pressure above the atmospheric pressure may be found desirable. Likewise, inert gases may be sealed within the unit for some uses. The unit is then ready for use and can be installed without further preparation.

While it has been found that an apparatus, as above described, will greatly facilitate and improve the fabrication of the multiply glass sheet glazing units in a wide range of sizes that can be accommodated on such apparatus, it has also been possible to modify the construction, within the spirit of the invention, to provide a form of apparatus particularly adapted for processing glass sheets of relatively small dimensions.

This modified form of construction is shown in Figs. 14 to 20 inclusive, and comprises a work table 122 having vertical standards or legs 123 and a horizontal platform 124 supported upon horizontal channels 125. Rising from the channels 125 is a pair of channels 126 at opposite ends of the table, which channels are braced by members 127 and connected together at their upper ends and also intermediate their ends by cross bars 128. The cross bars 128 have attached thereto bearings 129 in which is journaled a vertical shaft 130 provided with adjustable collars 131 located above each of the bearings 129 so that said shaft can be raised or lowered with reference to the bearings upon shifting of the collars along the shaft.

An articulated support 132, carried at the lower end of shaft 130, comprises two pivotally connected arms 133 and 134 which cooperate in substantially the same manner as the arms 64 and 65 of support 34 above described, to support a tape metering unit 135 for horizontal sliding movement relative to the edges of the glass sheet 136. The arms 133 and 134 are preferably made of a relatively light-weight channel construction so that their radial swinging movements with reference to each other and to the glass sheet 136 may be easily controlled by an operator without the intervention of a tensioning element to urge the arms elbow-wise into folded relation.

The metering unit 135 is carried at the outer end of arm 134 by a bolt 137 rotatably received within a bushing 138 on said arm and being secured to the guide plate 139 of the metering unit intermediate the ends thereof. A handle 140 for facilitating movement of the metering unit by the operator is carried at the upper end of bolt 137. Manipulation of the metering unit and the extent of its contact with the edges of the glass sheet 136 to be processed may thus be determined by the lateral and downward pressure exerted by the operator upon the handle 140. As shown particularly in Figs. 16 and 17, the metering unit 135 comprises the guide plate 139 to the opposite ends of which are secured brackets 141 carrying a fiber strip 142. As in the construction above described, the central portion of the guide plate 139 is cut out or recessed to form a sloping surface 143 to facilitate the easy placement of a soldering iron to join the lead tape 144 to the metallic coatings 145 on the glass sheet 136.

The strip of fiber 142, carried at its ends by the brackets 141, affords a locating surface by which the metering unit 135 is positioned along a desired edge of the glass sheet 136 and maintained so that as the metal tape 144 is fed out and secured to the metallic coatings on the glass, the said tape will be held taut and in a straightened condition. Grooves 146 are provided at the opposite ends of the guide plate 139 to receive the upper edge portion of the metal tape 144 and guide it through the plate. The tape is initially fed from a supply reel 147 into the unit 135 and by the grooves 146 acting upon the upper edge thereof may be manually urged downwardly onto the metallic coating 145 according to the requirements of the application. The continuous feeding and attaching of the metal tape may be seen in Fig. 16 wherein the metering unit 135 is being moved to the left, with portions of the tape being shown affixed, as at 148, by the fillets of solder 149.

During the application of the metal tape 144 to form the separator 150, the glass sheet 136 is supported on a horizontal table top 151. This table top is provided upon its underside with a boss 152 received in a ring 153 secured to the platform 124. The boss 152 slidably interfits within the ring 153 in order that the table top 151 may be raised and lowered. Obviously, the means for raising and lowering the table top may partake of various constructions and still produce a similarity of movement and in order to provide a simple arrangement of operative parts, a foot lever 154 is shown having an upwardly extending rod 155 hingedly attached thereto by a pin 156. The upper end of the rod is received within a recess in the bottom of the boss 152. The lever 154 is pivotally supported by a bracket 157 carried by a portion of the frame, and is ordinarily held in an elevated position (Fig. 20) by a tension spring 158 to maintain the table top 151 in the position illustrated in Fig. 14. Upon completion of an assembly operation, depression of the foot lever 154 allows the boss 152 to sink into the ring 153 to lower the table top and permit easy removal of the glass sheet.

The table top 151 is provided on its upper surface with a flexible support for the glass sheet which also affords a means whereby the sheet will be restrained from sliding or turning as the metering unit is moved relative to its edge portions. The flexible support comprises an annual rim or wall 160 such as may be found in various and conventional types of vacuum-creating or suction cup devices. The sheet of glass, when placed upon the rim and forced downward, causes an exhausion of air so that a vacuous condition is created. To produce this simple function, a plurality of pegs 161 are located in the table top 151 outwardly of rim 160. One of the pegs, as shown in Fig. 18, is constructed in the form of a spring-pressed plunger 162 moving within a casing 163. The plunger is moved therein by a handle 164 extending through a slot 165 formed in the casing wall. As shown, the plunger 162 has been lowered to compress the spring 166 and is in glass loading position.

The glass sheet 136 is placed on the rim 160 and forced downward to exhaust air from the support 160 and until it contacts the solid pegs 161 and upper end of the plunger 162. The plunger 162 is then raised by moving the handle 164 into the upper end of slot 165. The suction produced in the flexible support will thus become more pronounced and will act to hold the sheet against movement.

The formation of the separator strip 150 is now begun at a midpoint along one side of the glass sheet as indicated at 167 in Fig. 15. As the attachment of the tape progresses and a corner of the sheet is reached, the table is rotated to position a second side of the sheet adjacent the operator. The table top 151 is normally secured against rotation by a latch 168 pivotally mounted in a bracket 169 on the platform 124. The end of the latch enters recesses 170 formed in the periphery of the boss 152 at regularly spaced points and, as one side of the sheet is completed, disengagement of the latch 168 from one recess 170 will allow rotation of the table top in a turn of substantially 90 degrees or until a subsequent recess reaches the point of engagement with the latch.

When the separator strip formation has been completed, depression of the lever 154 will lower the table top 151 from the working area and, by returning the handle 164 to the lower end of the cam slot 165, the suction of the flexible support 159 may be broken to remove the glass sheet.

As brought out above, it is an aim of this invention to provide a novel apparatus for the preliminary assembly of an all glass-metal double glazing unit. Of prime importance in each of the constructions herein illustrated is the metered supplying of the separator strip to the glass sheet so that it is located and attached under conditions which assure straightness throughout its continuity along a predetermined line as well as a definite setting of the tape on the metallic coatings on the glass to prevent irregular rising of areas in the tape above a common plane. This invention also provides a construction of economical manufacture by which the efficiency of such operations in the assembly of multiply glass sheet glazing units is materially increased.

It is to be understood that the forms of the invention herewith shown and described are to be taken as illustrative embodiments only, of the same, and that various changes in the shape, size and arrangement of parts may be resorted to without departing from the spirit of the invention or the scope of the subjoined claims.

I claim:

1. In apparatus for positioning a metal strip in the form of a flexible metal tape around the marginal portions of a flat sheet of glass or other material, the combination of means for supporting the sheet in a horizontal position, tape applying means associated with the supporting means including means carrying a source of supply of tape and a vertically arranged guide plate mounted for vertical movement and having a guide channel in the lower edge thereof for slidably receiving the tape therein from said source and for positioning a section thereof in predetermined vertical position upon said sheet, means whereby said plate can be moved upwardly to receive the tape and downwardly to press it against the glass, and means for mounting said supporting means and tape applying means for horizontal movement relative to one another to effect feeding of the tape from said source of supply through said channel and the positioning of successive sections thereof upon the upper surface of said sheet.

2. In apparatus for positioning a metal strip in the form of a flexible metal tape around the marginal portions of a flat sheet of glass or other material, the combination of means for supporting the sheet in a horizontal position, tape applying means associated with the supporting means including means carrying a source of supply of tape and a vertically arranged guide plate mounted for vertical movement and having a guide channel in the lower edge thereof for slidably receiving the tape therein from said source and for positioning a section thereof in predetermined vertical position upon said sheet, means whereby said plate can be moved upwardly to receive the tape and downwardly to press it against the glass, and means for mounting said supporting means and tape applying means for horizontal movement relative to one another to effect feeding of the tape from said source of supply through said channel and the positioning of successive sections thereof upon the upper surface of said sheet, the said guide plate having a portion thereof cut away to expose the tape to facilitate attachment thereof to the sheet.

3. In apparatus for positioning a metal strip in the form of a flexible metal tape around the marginal portions of a flat sheet of glass or other material, the combination of means for supporting the sheet in a horizontal position, tape applying means associated with the supporting means including an articulated support, a vertically arranged guide plate carried by said articulated support and a source of supply of tape, said guide plate being movable vertically and having a guide channel in the lower edge thereof for slidably receiving the tape therein from said source and for positioning successive sections thereof vertically upon the sheet upon relative movement between the guide plate and sheet supporting means, means whereby said plate can be moved upwardly to receive the tape and downwardly to press it against the glass, means associated with said guide plate and having portions engaging the edge of the sheet for locating the tape a predetermined distance inwardly from the edge thereof, and a portion of the guide plate being cut away to expose the tape to facilitate attachment thereof to said sheet.

4. In apparatus for positioning a metal strip in the form of a flexible metal tape around the marginal portions of a flat sheet of glass or other material, the combination of rotatable means for supporting the sheet in a horizontal position, means for locking said supporting means against rotation, tape applying means associated with the supporting means including an articulated support comprising a pair of pivotally connected horizontal arms, a vertically arranged guide plate carried by one of said arms and a source of supply of tape, said guide plate being vertically movable and having a guide channel in the lower edge thereof for slidably receiving the tape therein from said source and for positioning successive section thereof vertically upon the sheet upon relative movement between said guide plate and sheet supporting means, means whereby said plate can be moved upwardly to receive the tape and downwardly to press it against the glass the tape applying means having portions engaging the edge of the sheet for locating the tape a predetermined distance inwardly from the edge thereof, a portion of the guide plate being cut away to expose the tape to facilitate attachment thereof to said sheet, and means for moving said sheet supporting means vertically relative to the tape metering means.

5. In apparatus for positioning a metal strip in the form of a flexible metal tape around the marginal portions of a flat sheet of glass or other material, the combination of means for supporting the sheet in a horizontal position, tape applying means associated with the supporting means including means carrying a source of supply of tape, a guide plate for receiving the tape from said source and for locating it upon said sheet and a frame carrying said guide plate for vertical movement relative to said frame and having portions engaging the edge of the sheet for locating the tape a predetermined distance inwardly from the edge thereof, and means for mounting said supporting means and tape applying means for horizontal movement relative to one another to effect feeding of the tape from said source of supply and the positioning thereof upon the upper surface of said sheet.

6. In apparatus for positioning a metal strip in the form of a flexible metal tape around the marginal portions of a flat sheet of glass or other material, the combination of rotatable means for supporting the sheet in a horizontal position, means for locking said supporting means against rotation, tape applying means associated with the supporting means including an articulated support comprising a pair of pivotally connected horizontal arms, a frame carried by one of said arms, a guide plate carried by said frame for vertical movement with respect thereto and a source of supply of tape, said guide plate having a guide channel for slidably receiving the tape therein from said source and for positioning it upon the sheet upon relative movement between said guide plate and sheet supporting means, said frame having portions engaging the edge of the sheet for locating the tape a predetermined distance inwardly from said edge, a portion of the guide plate being cut away to expose the tape to facilitate attachment thereof to said sheet.

7. In apparatus for positioning a metal strip in the form of a flexible metal tape around the marginal portions of a flat sheet of glass or other material, the combination of means for supporting the sheet in a horizontal position, tape applying means associated with the supporting means including means carrying a source of supply of tape, a guide plate for receiving the tape from said source and for locating it upon said sheet and a frame carrying said guide plate for vertical movement relative to said frame and having portions engaging the edge of the sheet for locating the tape a predetermined distance inwardly from the edge thereof, means for mounting said supporting means and tape applying means for horizontal movement relative to one another to effect feeding of the tape from said source of supply and the positioning thereof upon the upper surface of said sheet, and means for mounting said frame and guide plate carried thereby for pivotal movement about a vertical axis and also about a horizontal axis to effect release of a portion of the metal tape from the guide channel upon turning a corner of the sheet.

8. In apparatus for positioning a metal strip in the form of a flexible metal tape around the marginal portions of a flat sheet of glass or other material, the combination of rotatable means for supporting the sheet in a horizontal position, means for locking said supporting means against rotation, tape applying means associated with the supporting means including an articulated support comprising a pair of pivotally connected horizontal arms, a frame carried by one of said arms, a guide plate carried by said frame for vertical movement with respect thereto and a source of supply of tape, said guide plate having a guide channel for slidably receiving the tape therein from said source and for positioning it upon the sheet upon relative movement between said guide plate and sheet supporting means, said frame having portions engaging the edge of the sheet for locating the tape a predetermined distance inwardly from said edge, a portion of the guide plate being cut away to expose the tape to facilitate attachment thereof to said sheet, and means for mounting said frame and guide plate carried thereby for pivotal movement about a vertical axis and also about a horizontal axis to effect release of a portion of the metal tape from the guide channel upon turning a corner of the sheet.

PAUL E. SPAHN.

REFERENCES CITED

The following references are of record in the file of this patent:

UNITED STATES PATENTS

| Number | Name | Date |
| --- | --- | --- |
| 1,253,467 | Cissna | Jan. 15, 1918 |
| 1,792,393 | Phillips | Feb. 10, 1931 |
| 2,235,681 | Haven et al. | Mar. 18, 1941 |
| 2,383,208 | Mustered | Aug. 21, 1945 |